Jan. 5, 1932.  A. J. LEWIS  1,839,401
OUTWARD GRIPPING CHUCK
Filed Sept. 12, 1929   2 Sheets-Sheet 1
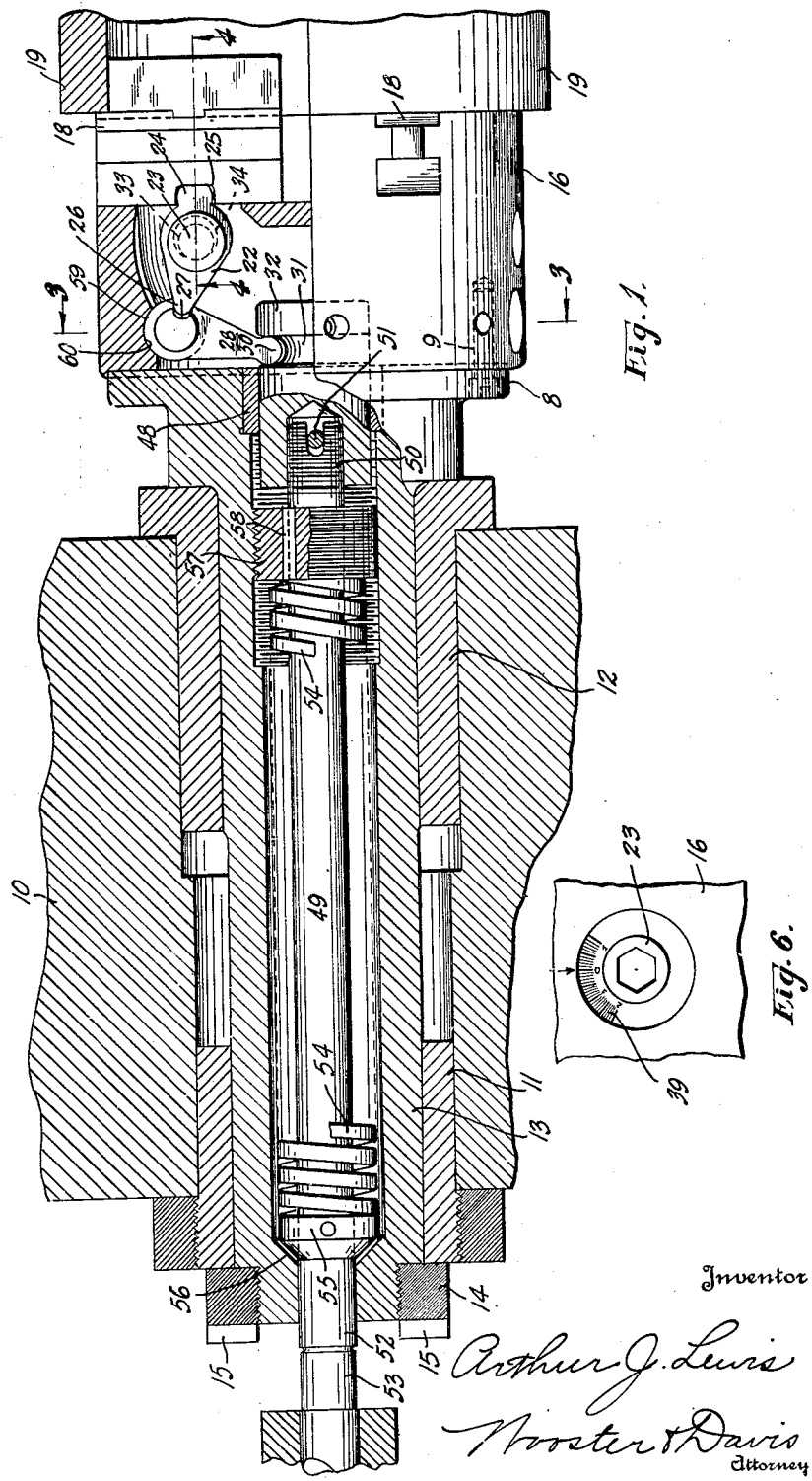
Inventor
Arthur J. Lewis
Wooster & Davis
Attorneys Jan. 5, 1932.   A. J. LEWIS   1,839,401
OUTWARD GRIPPING CHUCK
Filed Sept. 12, 1929   2 Sheets-Sheet 2
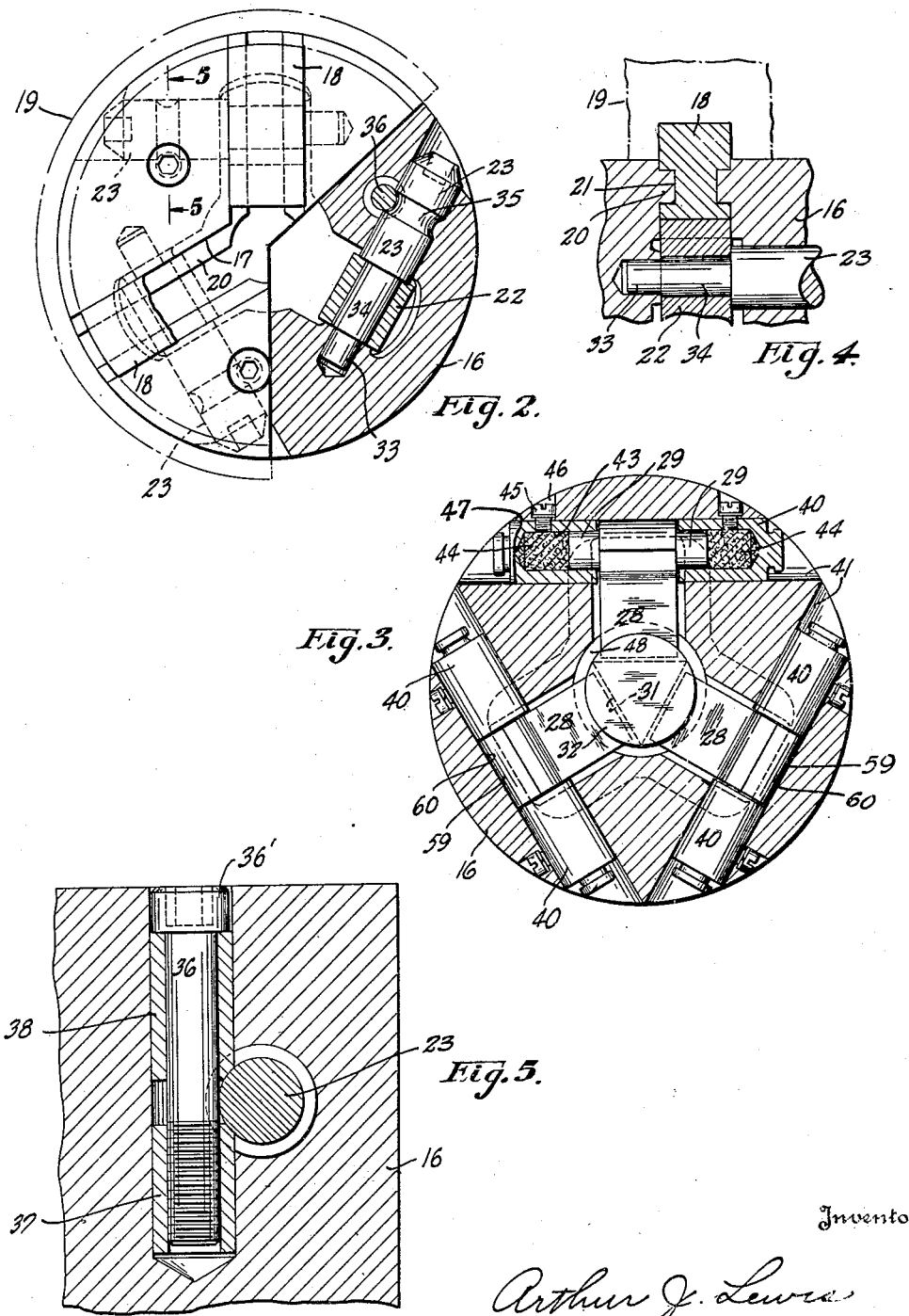
Inventor
Arthur J. Lewis
By Wooster & Davis
Attorneys.

Patented Jan. 5, 1932

1,839,401

UNITED STATES PATENT OFFICE

ARTHUR J. LEWIS, OF STRATFORD, CONNECTICUT, ASSIGNOR TO THE BAIRD MACHINE COMPANY, OF BRIDGEPORT, CONNECTICUT, A CORPORATION OF CONNECTICUT

OUTWARD GRIPPING CHUCK

Application filed September 12, 1929. Serial No. 392,155.

This invention relates to a chuck, particularly to a chuck which may be operated automatically, although it is not limited to such operation, and has for an object to provide an outwardly gripping chuck which can be used in a multiple spindle chucking machine of the type illustrated in my copending application, Serial No. 310,156, filed Oct. 3, 1928, but it is equally adapted for use on a single spindle machine.

It is also an object of the invention to provide a chuck in which the jaws are operated by a multiplied lever movement which is so arranged as to secure a great clamping effect of the jaws.

With the foregoing and other objects in view, the invention consists in certain novel features of construction, combinations and arrangements of parts as will be more fully described in connection with the accompanying drawings.

In these drawings:

Fig. 1 is a longitudinal section through a chuck involving my improved construction and a portion of a rotatable turret in which it may be mounted, the head being partly in section to permit the operating details of one of the jaws to be seen in elevation.

Fig. 2 is an end view looking from the right or jaw end of Fig. 1 with a portion of the head in section to more clearly show the construction.

Fig. 3 is a transverse section substantially on line 3—3 of Fig. 1.

Fig. 4 is a detail section substantially on line 4—4 of Fig. 1.

Fig. 5 is a detail section substantially on line 5—5 of Fig. 2, and

Fig. 6 is an enlarged view of the graduated end of an eccentric adjustable pivot pin for the jaw levers.

In the drawings, 10 indicates a rotatable turret which may carry a plurality of spindles, as indicated in my specification above mentioned, or it may be a stationary support. Mounted in this support are bearing bushings 11 and 12 for my improved chuck which includes a hollow rotatable spindle 13 mounted in these bushings and rotated by any suitable means, such as a clutch jaw, not shown, adapted to cooperate with a clutch jaw 14 mounted on the spindle and having clutch teeth 15. The spindle has at one end a flange 8 to which is secured a head 16 by any suitable means as screws 9, which head has radial guideways 17 for the jaws 18, the jaws being guided for outward gripping and releasing lateral movement toward and from the piece of work indicated at 19. The guideways 17 usually have guide ribs 20 extending into similar shaped grooves 21 in the sides of the jaws to retain these jaws in the head and permit their lateral sliding movement.

The jaws 18, as shown in Fig. 2, are equally spaced, and when there are three of them, they are one hundred and twenty degrees apart. Pivoted in the head to the rear are jaw operating levers 22 which are levers of the first class, one for each jaw, and they are mounted on eccentrically mounted pins 23 on which they turn as pivots. At their forward ends they each have an extension or head 24 projecting into a recess 25 in the wall of the jaw for operating the jaw. At the opposite side of the pivots 23 these levers are each provided with an extension or knot 26 cooperating with recesses 27 in second levers 28 each of these second levers being mounted in head 16 on pivot pins 29. It is to be noted that the outer surface 59 of the lever 28 is on the arc of a circle with the axis of its pivot as a center and that this surface seats directly in a correspondingly curved recess 60 in the head. Therefore, the lever is directly supported in the head, which support backs up the pivot studs 29, and takes a great deal of the strain off these studs. These second levers 28 each have an extension or arm 30 extending into a transverse recess or groove 31 in a block 32. This block in the construction shown is mounted to reciprocate in a guide bushing 48 in the longitudinal opening in the spindle, and the recesses 31 are spaced about the block as indicated in Fig. 3 so that as the block is reciprocated the levers 28 are actuated by the reciprocation. The actuation of levers 28 will in turn serve to actuate the levers 22, and by means of head 24 serve to positively move jaws 18 either in to releasing or out to gripping position. The force exerted by the movement of block 32 will be greatly multiplied before it reaches the jaws 18 because of the mechanical advantage exerted by the levers 28 and 22, for lever 28 will exert a mechanical advantage equal to the ratio of the distance from its pivoting center to its point of contact, with block 32 as compared to its distance from the center to its point of contact with lever 22, and the mechanical advantage thus obtained will be further multiplied by the ratio of the distance from the pivoting center of lever 22 to its point of contact with lever 28 as compared to the distance from its pivoting center to the point of contact with jaw 18. Thus it will be seen that a small amount of force exerted by the block 32 will be greatly multiplied and hence give the large gripping force required to hold the work, and the levers are at such an angle that a small holding force on the block 32 will prevent the jaws from releasing the work. Operation of the block 32 in the opposite direction will likewise serve to positively actuate the levers and jaws in the opposite direction to release the work.

As will be obvious, as a result of this arrangement, the distance that jaws 18 will be moved thereby from gripping to releasing position and vice versa, will be relatively small, so that other means are ordinarily provided to allow for adjusting the jaws to grip work of different sizes. This is arranged for by the eccentric mounting of the pivoting pins 23 for jaws 18. The pins 23 have bearings in the head 16 and the lever, the bearing 33 for the lever being eccentric to the bearings 34 in the head so that on turning movements of the pin, the position of the lever may be adjusted. The pin 23 may have a circumferential groove 35 in which a transverse clamping screw 36 extends, and this screw is threaded at one side of the pin in a sleeve 37, while the sleeve 38 is slidable on the screw 36 on the opposite side of the pivot pin 23 and engages under the head 36′ at one end, and by turning the screw 36 the sleeves 37 and 38 may be clamped against opposite sides of the pin to prevent its turning in the head after it has been adjusted. The cooperation of the screw 36 and the groove 35 retain the pivot pin 23 in the head 16. The head of the pin 23 may be provided with a scale 39 to indicate various positions of the pin.

The pivots 29 for the second levers 28 are each mounted in a pair of telescoping sleeves or plugs 40 in a bore 41 in the head 16. Each sleeve or plug 42 has a central bore 43 closed at one end and in which an oiled wick 44 is placed, and the pivots 29 are supported in these bores 43. The sleeves 40 are held in position in the head 16 by means of set screws 45 which pass through openings 46 in the head to openings 47 in the sleeves. As is apparent, screws 45 may be temporarily removed to allow the wicks 44 to be re-oiled either through openings 46 and 47, or by removing the sleeves 40.

The block 32 is mounted for sliding movements longitudinally of the spindle, and may be guided in the bushing 48 which keeps it properly centered. The block is reciprocated by means of a rod 49 extending longitudinally of the spindle and secured at one end to the block by any suitable means, such as a screw thread 50 and a pin 51. At its opposite end the rod 49 is slidable in the spindle and is accessible, as shown at 52 for operation by any suitable means, such as a stud 53, which may be operated by a cam or other suitable means as described in my application above mentioned. The rod 49 is embraced by a spring 54 which engages a washer 55 at one end secured to the rod and which may abut against shoulder 56 when there is no work in the chuck to limit outward movement of the rod, while at its other end the spring rests against a stop bushing 57 threaded in the spindle. The rod 49 slides in the bushing 57 but is splined thereto by a key 58 which will allow sliding movement of the rod, but will prevent its turning in the bushing. Therefore, rotation of the rod will adjust the bushing 57 longitudinally of the spindle to vary the tension of the spring 54. The collar or washer 55 is secured to the rod 49, and therefore, spring 54 tends to force this rod to the left or to the position shown in Fig. 1. This movement of the rod carries with it the block 32 which pivots the second levers 28 to operate the levers 22 to force the jaws 18 outwardly or away from each other and clamp the work 19.

It will be apparent from an inspection of Fig. 1 and from the disclosure above that the elements are so proportioned and arranged that the work will be securely clamped as a result of the mechanical advantage supplied by the two sets of levers, and that this same compound leverage system necessitates very little holding force to keep the jaws in gripping position, which is much less than that supplied by spring 54, and therefore no locking device is required to lock the jaws in the clamped position. Another important feature of the eccentric mounting for the levers 22 is that by rotating pins 23 the heads 24 on the levers may be withdrawn from the recesses 25 in the jaws permitting the jaws to be slid from the head.

It will be apparent that with this construction and arrangement very few elements are required, and therefore, the construction is a very simple one, and an immense clamping pressure may be applied to the jaws with a relatively small operating force. Due to the leverage involved when the jaws are clamped against the work, there can be no reverse movement of the operating block 32 by pressure from the jaws so long as there is pressure exerted by the spring 54. Therefore, no locking means is required. It will, of course, be obvious that other means than the spring 54 and the element 53 may be used for operating rod 49 and block 32 for manipulating the jaws of the chuck. It will also be apparent that there is positive operation of the jaws in both directions. Although I have shown a chuck involving three jaws, this same mechanism may be used in a chuck having a lesser or a greater number of movable jaws.

Having thus set forth the nature of my invention, what I claim is:

1. In a chuck, a head, a laterally movable jaw mounted in said head, a member movable longitudinally of the axis of the head, a compound lever comprising two connected levers each of which is pivoted on the head, one of said levers being connected to said jaw and the other to said member for transmitting the movement of said member to said jaw, and means for moving said member.

2. In a chuck, a head, a laterally movable jaw mounted in said head, a member movable longitudinally of the axis of the head, a compound lever pivoted in said head and mounted for transmitting the longitudinal movement of said member into lateral movement of said jaw, said compound lever comprising two levers each pivoted to the head and connected together so that force applied to one is transmitted to the other, one of said levers being connected to the movable member and the other being connected to said jaw, and means for moving said member.

3. In a chuck, a head, a plurality of gripping jaws mounted for lateral movement in said head, a member movable longitudinally of the axis of said head, a plurality of compound levers pivoted in said head and connected to said movable member and to said gripping jaws for transmitting movement from said member to said jaws, each of said compound levers comprising a pair of connected levers each of which is pivoted to the head, one of each pair of levers being connected to the movable member and the other connected to its respective jaw, and means for moving said member.

4. In a chuck, a head, a laterally movable jaw mounted in said head, a lever pivoted in said head and connected to said jaw, a member movable longitudinally of the axis of the head, a second lever having pivots on opposite sides in said head and connected to said member, said second lever and the head being provided with complementary curved surfaces between said pivots forming a direct supporting bearing for the lever in the head, said first lever being also connected to and operated by said second lever, and means for shifting said member to operate said second lever.

5. In a chuck, a head, a laterally movable jaw mounted in said head, a recess in said jaw, a lever pivoted in said head having one end projected into said jaw recess, a second lever pivoted in said head, a recess in said second lever adapted to receive the other end of said first lever, a member shiftable longitudinally of the axis of the head, said member having a recess to receive an end of said second lever, and means to shift said member.

6. In a chuck, a head, a plurality of outwardly gripping jaws laterally movable in said head, and each having a recess, a lever for each of said jaws pivoted in said head and extending into the recess in said jaw, a pivot for said lever eccentrically adjustably journaled in said head, a second lever for each first lever having a recess to receive an extension of said first lever, a member movable longitudinally of the axis of the head, said member being recessed to receive extensions of said second levers, and means for shifting said member to thereby actuate said jaws in unison.

7. In a chuck, a head, a laterally movable jaw mounted in said head, a member movable longitudinally of the axis of the head, a lever pivoted in said head for transmitting movement from said member to said jaw, said pivot comprising studs on opposite sides of the lever, said head having a bore, a pair of sleeves in said bore to receive and hold said pivot studs and closed at one end, fibre oil retaining wicks in said sleeves, and means for moving said member.

8. In a chuck, a head, a laterally movable jaw mounted in said head, a recess in said jaw, a lever pivoted in said head having one end projected into said jaw recess, a second lever pivoted in said head, a recess in said second lever adapted to receive the other end of said first lever, a member shiftable longitudinally of the axis of the head, cooperating means on the shiftable member and the second lever for operating said lever, and means to shift said member.

In testimony whereof I affix my signature.

ARTHUR J. LEWIS.